Jan. 28, 1964  B. R. HARRELL ETAL  3,119,704
PREPARATION OF AERATED CEMENTITIOUS PRODUCTS
Filed Dec. 4, 1961
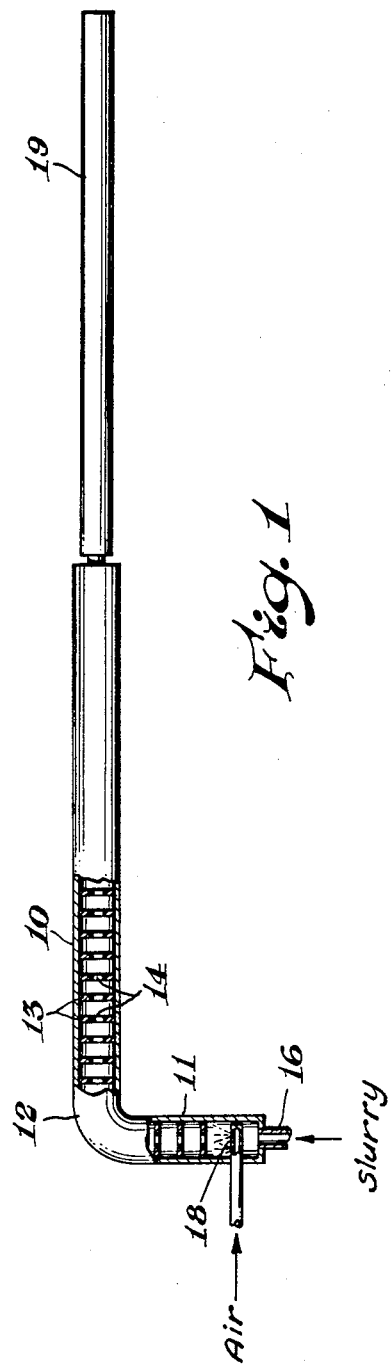
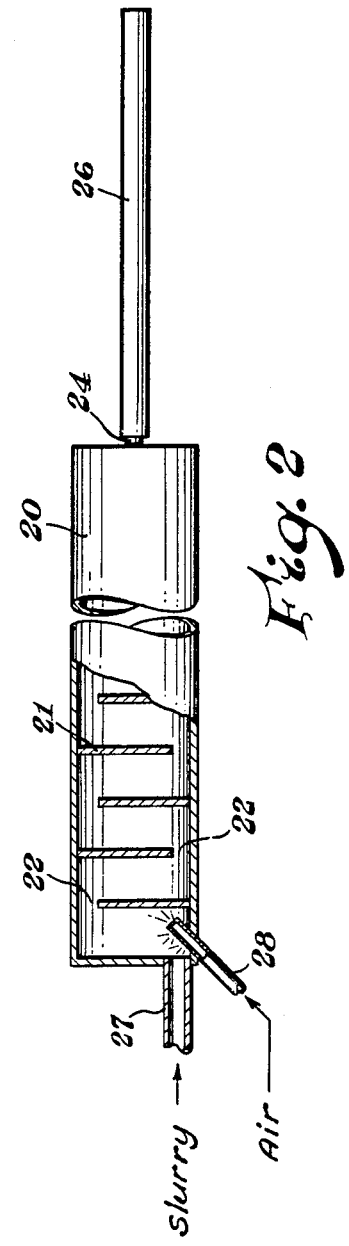
INVENTORS.
Bob R. Harrell
James A. Wilkinson
BY
ATTORNEY

3,119,704
PREPARATION OF AERATED CEMENTITIOUS PRODUCTS

Bob R. Harrell, Lake Jackson, and James A. Wilkinson, Freeport, Tex., assignors to The Dow Chemical Company, Midland, Mich., a corporation of Delaware
Filed Dec. 4, 1961, Ser. No. 156,652
2 Claims. (Cl. 106—88)

This invention relates to a process for foaming or aerating cementitious materials to form cellular products.

Cementitious products in foam or cellular form are finding wide applications in construction and other fields. The weight of such products is considerably reduced and thus may be used for many purposes.

Numerous difficulties are encountered in producing foamed cementitious products. Since generally the cementitious products before setting are slurries, apparatus and processes for producing organic foams of unslurried materials are inoperative. While a foam may be produced by extensive agitation of a gas with some cement slurries, such as by beating or mixing, the product obtained is of inferior strength. Due to the difficulty of foaming cementitious slurries, many have adopted the method of foaming the liquid constituents of the cement product and then adding the solid or cement constituent to this foam to obtain a cellular or aerated product. While a foamed product may be obtained by this method, it is difficult to obtain a uniform product without extensive mixing which will result in at least partially collapsing the foam.

It is therefore an object of this invention to provide an improved process for the aeration of cementitious slurries to produce a cellular or foamed product. A still further object is to provide a process for the preparation of a magnesium oxychloride foamed product.

The above and other objects are attained according to the invention by injecting an inert gas such as air and the cementitious material into an elongated tube in sufficient amounts to obtain a combined velocity of the air and the cementitious material in the tube in the range of 0.15 to 3.0 feet per second, passing the constituents through the tube having at least one change of direction of at least 60 degrees and a multiplicity of obstructions or changes in direction such that a pressure drop of from 3 to 30 pounds is obtained which is due to changes in velocity and direction of flow within the tube. By employing an elongated tube having the particular type of resistance due to flow within the narrow range of 3 to 30 pounds per square inch, the air becomes properly dispersed in the slurry so that a cellular or foam product of cementitious material is obtained without vigorous agitation. As a result, upon allowing the mixture to harden, a product of uniform cell size and improved strength is obtained.

As used herein, the term "inert gas" means a gas which is is inert to the cementitious material.

The process for producing the foamed cementitious material may be more easily understood when the detailed description is considered in conjunction with the attached drawings, in which:

FIGURES 1 and 2 show different embodiments of the apparatus or gun used in foaming the cementitious materials.

In FIGURE 1 the apparatus shown has a section 10 of an elongated tube in the horizontal plane attached to a second section 11 in the vertical plane by means of a bend 12, such as a 90 degree elbow. Within sections 10 and 11 a multiplicity of obstructions 13 are placed such that the passage or openings 14 at the obstructions are at least ¼ inch and the ratio of the cross-section area of the passage or opening to the cross-sectional area of the tube is not greater than 1 to 16. The slurry of cementitious material to be foamed is introduced into the gun at inlet 16 with the air being charged into the gun through inlet 17 and injected into section 11 by use of a sparger 18. A conduit 19 of flexible material, such as a rubber hose, is attached to section 10 of the elongated tube at the end distance from bend 12. The flexible conduit aids in distributing the foam produced to the desired locations. The slurry and the air charged to the gun are metered into the apparatus through their respective inlets by means of standard and well known equipment (not shown).

In the apparatus it is essential that 3 to 30 pounds of pressure drop within the apparatus be due to changes in velocity or changes in direction of flow of the constituents in the apparatus. When this pressure drop due to contraction and expansion losses and changes in direction is provided, sufficient gradual mixing is obtained to obtain a uniform foamed product. Generally the apparatus is constructed so that relatively all of the pressure drop obtained in the apparatus is due to changes in direction and velocity.

The ratio of the cross-sectional area of the opening through the obstruction to that of the tube is also critical. The openings of the constrictions must be such that a ratio of cross-sectional area of the tube to the area of the restricted opening is not greater than 1 to 16. With small sized openings the mixing or agitation obtained within the apparatus is too great to give a strong product. If a series or many small passages are maintained, caking will be obtained. Thus the restriction must have an opening at least equal to the cross sectional area of a ¼ inch in diameter opening. Likewise, when the restrictions or obstructions are not sufficient to materially change the velocity of flow of the constituents, mixing or aeration is not obtained. Thus, the restrictions or obstructions within the tube must be such that the cross-sectional area is not less than that of an opening having a ¼ inch diameter. Any obstructions or restrictions may be used to give the necessary changes in velocity to obtain the required low agitation-type mixing. Sections of reduced diameter of appreciable length may be inserted or ordinary orifice plates and the like used.

In FIGURE 2, another embodiment of the apparatus is shown. The apparatus comprises an elongated tube 20 in which are inserted a multiplicity of baffles 21. These baffles are attached to tube 20 and provide an opening 22 at one end for the slurry and the air to pass. The baffles are alternately located so that the constituents flowing through the tube make a series of 180° turns before being discharged at the outlet 24. As in the apparatus shown in FIGURE 1, a flexible conduit of material 26, such as rubber, is likewise attached to the outlet 24. The slurry and air are metered into tube 20 by use of well known equipment (not shown) through inlets 27 and 28, respectively. The apparatus may be constructed so that the openings 22 between the end of baffles 21 and the inner wall of the tube are smaller than the cross-sectional area between the baffle. Thus the constituents moving through the apparatus will be moving alternately at a relatively high velocity and then at a relatively low velocity. The apparatus may also be constructed so that each of the openings 22 between the baffles and the wall is equal to the cross-sectional area between the baffles whereby substantially uniform velocity is maintained. In the latter described apparatus the resistance or pressure drop within the apparatus will be mainly due to the change in direction of the flow, while in the first described apparatus the pressure drop obtained would be the result of the combination of change in velocity and change in direction of flow.

It is apparent that an apparatus embodying the invention may be constructed in forms other than those shown in FIGURES 1 and 2. Instead of using a conduit of enlarged cross-section and employing baffles as in FIGURE 2, an apparatus can be constructed of a continuous piece of conduit having a series of turns or bends. When such an apparatus is used, generally it is constructed with a series of 180° turns. However, a series of turns other than 180° may be used or the tube even may be coiled to obtain a continuous but gradual change in direction of sufficient extent to give the proper pressure drop.

In work leading to this invention it was found that to produce a foam of cementitious material of improved strength it is necessary to aerate or intermix the cementitious material with air under low agitation. Extensive agitation or mixing is detrimental to the strength of the product. However, it is essential to sufficiently mix the air with the slurry to distribute the air in the slurry in uniform air pockets or voids. By the apparatus of the instant invention, low agitation mixing is obtained by employing a series of changes in velocity or direction of flow within the apparatus such that a pressure drop between 3 to 30 pounds per square inch is obtained. Sufficient agitation is obtained, however, to intermix the air with the cement to form the desired aerated slurry. In an apparatus as shown in FIGURE 1, obstructions are used to change or alternate the velocity of the constituents within the tube. To obtain the required low agitation mixing, generally from 12 to 35 obstructions or restrictions are required. Preferably the number of obstructions employed is generally in the range of 15 to 25. With the above number of obstructions, usually the total pressure drop obtained does not exceed 35 pounds per square inch of which over 85 percent is due to the changes in velocity.

Since in an apparatus similar to that shown in FIGURE 2 the mixing obtained is due to both velocity changes and directional changes a less number of baffles may be used than the number of obstructions in an apparatus of FIGURE 1. Generally, from 6 to 20 baffles are employed. When the apparatus used is a tube having a multiplicity of 180° turns, generally from 8 to around 40 of these bends are used. With the above values a pressure drop due to the particular resistance is in the range of 3 to 30 pounds at the combined velocity of the air and the slurry in the unrestricted area of the tube in the range of 0.15 to 3.0 feet per second.

The ratio of air to slurry used in foaming the cementitious product depends upon the material employed and also the product desired. Generally, a less dense product is obtained with the employment of a greater amount of air. For magnesium oxychloride cement a ratio of the volume of air to that of the slurry used is usually in the range of from 3.5 to 1 to 12 to 1 where the volume of the air is measured at atmospheric pressure.

The following examples further illustrate the invention.

*Example I*

An apparatus was constructed similar to that shown in FIGURE 1. A Saran pipe, 1½ inch I.D., was used. The vertical section, 11 as shown in the drawing, was 6 inches long and had three obstructions placed on two inch centers. Each obstruction was 1 inch long and had an opening of ¼ inch. At the top of the 6 inch vertical section, a 90 degree elbow was used to connect the vertical section to a horizontal section of approximately 18 inches. In the 18 inch section, 9 obstructions similar to those in the vertical section were used. These were likewise one inch in length and set on 2 inch centers. At the end of the 18 inch section a reducer was used to reduce the discharge to ½ inch to which approximately 3 feet of rubber hose was attached.

A slurry of magnesium oxychloride cement was prepared which had a composition of 13.7 weight percent of magnesium chloride, 4.1 weight percent of magnesium sulfate, 33.0 weight percent of magnesium oxide, 1.0 weight percent of a surfactant and 48.2 weight percent water. The slurry was charged into the gun described above and air was injected into the gun at a volume ratio of 6 volumes of air to one of the slurry. A pressure drop within the gun of approximately 7 pounds per square inch was obtained. The cellular or foam product obtained after setting had a density of 10.0 pounds per cubic foot and a compressive strength of 56 pounds per square inch.

To illustrate the improvement in strength of the product obtained by using the apparatus employing low agitation aeration in accordance with the invention, a magnesium oxychloride slurry having a composition similar to that above was agitated by use of electric mixers and air injected until a foam product obtained had a density of 10 pounds per cubic foot. Upon setting and testing this foamed or cellular product, it was found to have a compressive strength of only 35 pounds per square inch.

A magnesium oxychloride cement slurry similar to that above except free of the magnesium sulfate was intermixed with a gas producing agent, magnesium hydride, which upon addition and intermixing with the slurry resulted in the evolution of gas and foaming of the slurry. A foam product was obtained which had a density of 10 pounds per cubic foot and a compressive strength of only 33 pounds per square inch. No useful product could be obtained with slurries containing even small amounts of magnesium sulfate.

To illustrate the effect of the openings of the obstruction in the apparatus, the 1 inch obstructions of ¼" opening were removed and replaced with ones having a ½" opening. A slurry similar to that above and air was again introduced into this apparatus at the same rate as above but no satisfactory foamed product was obtained. The rates of the slurry and the air were increased until 2.5 cubic feet of slurry per hour and 10 cubic feet of air were being charged into the gun. No satisfactory operation of the gun was obtained. Surging was obtained and no foamed product was made.

Similar unsatisfactory results were obtained when the obstructions used had an opening of 1/16 of an inch. At all flow rates, surging was obtained and no foam was produced.

*Example II*

An apparatus operating on a principle of obtaining the mixing through change of direction was constructed of ¾ inch piping using 90° elbows and short nipples between the elbows to form a multiplicity of 180° bends or turns. The apparatus had 40 elbows or direction changes and was approximately 40 feet in length. To the end of the apparatus a reducer was installed reducing the discharge to ½ inch to which a rubber hose of approximately 6 feet was attached. In operating this apparatus, with the same magnesium oxychloride cement slurry as used above, at the rate of 4.4 cubic feet per hour of slurry and 27.0 cubic feet per hour of air, a pressure drop of 24 pounds per square inch was obtained. The product obtained had a density of 12.4 pounds per cubic foot and a compressive strength of 80 pounds per square inch.

When the number of bends was decreased to 4, efficient foaming could not be obtained and low density material could not be produced.

*Example III*

With the apparatus described in Example I, a slurry of Portland cement containing 62.5 weight percent of Portland cement and balance water was made and charged into the apparatus at a rate of 1.0 cubic feet per hour. Air in an amount of 4.0 cubic feet per hour was also injected. A pressure drop of 5 pounds per square inch was obtained in passing the air and slurry through the apparatus. A foam product having a density of 21.0 pounds per cubic foot was obtained which upon curing had a compressive strength of 20 pounds per square inch.

A similar low density product was obtained when the apparatus described in Example II was used.

Foam products were obtained by injecting air into the slurry while the slurry was being mixed with mechanical mixers. The products thus obtained had a density in the range of 30–40 pounds per cubic foot and a compressive strength of about 3 to 5 pounds per square inch.

What is claimed is:

1. A method of producing a light weight, cellular cement product which comprises providing a cementitious slurry and an inert gas, providing an elongated tube, injecting said inert gas and cementitious slurry into said elongated tube at a combined flow velocity of from 0.15 to 3.0 feet per second, said tube having from 8 to 40 changes of direction of about 180 degrees and additional resistance to flow such that a pressure drop in the range of 5 to 24 pounds per square inch is obtained due to changes in velocity and direction of flow within the tube, and removing light weight, cellular cement product from said tube.

2. A method of producing a light weight, cellular cement product which comprises providing a cementitious slurry and an inert gas, providing an elongated tube, injecting said cementitious slurry and inert gas into said elongated tube in sufficient amounts to obtain a combined flow velocity through the tube in the range of 0.15 to 3.0 feet per second, said tube having at least one change in direction of at least 60 degrees and from 12 to 35 obstructions having openings of a cross-sectional area at least equal to that of a one-quarter inch in diameter opening and a ratio of the cross-sectional area of the opening at the obstruction to the cross-sectional area of the tube not greater than 1 to 16, and recovering light weight, cellular cement product from said tube.

References Cited in the file of this patent

UNITED STATES PATENTS

| | | |
|---|---|---|
| 1,830,588 | Bittel | Nov. 3, 1931 |
| 2,122,076 | Voorhees | June 28, 1938 |
| 2,203,130 | Costello | June 4, 1940 |
| 2,645,463 | Stearns | July 14, 1953 |
| 2,661,194 | Katovsich | Dec. 1, 1953 |
| 2,864,714 | Dixon et al. | Dec. 16, 1958 |
| 2,933,293 | Ferrari | Apr. 19, 1960 |